United States Patent
Fernando

(10) Patent No.: US 9,769,506 B2
(45) Date of Patent: Sep. 19, 2017

(54) METHODS AND APPARATUS FOR INDEPENDENT DECRYPTION OF ENCRYPTED VIDEO FRAMES

(75) Inventor: Gerard M. X. Fernando, Mountain View, CA (US)

(73) Assignee: ZTE (USA) Inc., Richardson, TX (US)

( * ) Notice: Subject to any disclaimer, the term of this patent is extended or adjusted under 35 U.S.C. 154(b) by 348 days.

(21) Appl. No.: 14/005,249

(22) PCT Filed: Mar. 15, 2012

(86) PCT No.: PCT/US2012/029222
§ 371 (c)(1),
(2), (4) Date: Apr. 26, 2014

(87) PCT Pub. No.: WO2012/125824
PCT Pub. Date: Sep. 20, 2012

(65) Prior Publication Data
US 2014/0226814 A1    Aug. 14, 2014

Related U.S. Application Data

(60) Provisional application No. 61/453,539, filed on Mar. 16, 2011.

(51) Int. Cl.
*H04N 21/2347* (2011.01)
*H04L 9/06* (2006.01)
*H04N 21/4405* (2011.01)
*H04N 21/845* (2011.01)

(52) U.S. Cl.
CPC ........... *H04N 21/2347* (2013.01); *H04L 9/06* (2013.01); *H04N 21/4405* (2013.01); *H04N 21/8455* (2013.01)

(58) Field of Classification Search
CPC .......... H04N 7/1675; H04N 21/23476; H04N 21/26606; H04N 21/4623; H04N 21/835
USPC ........................................................ 380/200
See application file for complete search history.

(56) References Cited

U.S. PATENT DOCUMENTS

| | | | |
|---|---|---|---|
| 2005/0190911 A1* | 9/2005 | Pare | H04L 9/12 380/30 |
| 2006/0031873 A1* | 2/2006 | Fahrny | H04N 7/162 725/31 |
| 2006/0056625 A1* | 3/2006 | Nakabayashi | H04L 9/0662 380/46 |

(Continued)

OTHER PUBLICATIONS

"Digital Video Broadcasting (DVB); Head-end implementation of DVB SimulCrypt," ETSI TS 103 197 v1.3.1, Technical Specification, 250 pages, Jan. 2003.

(Continued)

*Primary Examiner* — Farid Homayounmehr
*Assistant Examiner* — Sanchit Sarker
(74) *Attorney, Agent, or Firm* — Perkins Coie LLP

(57) ABSTRACT

Techniques for generating an encrypted video bitstream include encrypting media data using a plurality of encryption keys and generating metadata associated with the encrypted media data. The metadata includes a first list based on the plurality of encryption keys and a second list based on initialization vector/feedback vector (IV/FV) information to facilitate independent decryption of at least one encrypted video frame included in the encrypted media data.

22 Claims, 8 Drawing Sheets

(56) References Cited

U.S. PATENT DOCUMENTS

| | | | | |
|---|---|---|---|---|
| 2006/0159266 A1* | 7/2006 | Chavanne | ............ | H04L 9/0637 380/262 |
| 2006/0200412 A1* | 9/2006 | Fahrny | .................... | G06F 21/10 705/50 |
| 2007/0033391 A1* | 2/2007 | Hiramatsu | .......... | H04L 63/0435 713/153 |
| 2007/0076876 A1* | 4/2007 | Kaplan | .................... | G06F 21/10 380/255 |
| 2008/0063195 A1* | 3/2008 | Li | ............................ | H04K 1/00 380/200 |
| 2009/0006869 A1* | 1/2009 | Satya Sudhakar | .......... | G06F 17/30073 713/193 |
| 2012/0060035 A1* | 3/2012 | Kalmady | ............ | G06F 21/6209 713/176 |
| 2012/0072713 A1* | 3/2012 | Begum | ................. | H04L 9/0822 713/153 |
| 2013/0283393 A1* | 10/2013 | Hierro | .................... | G06F 21/10 726/27 |
| 2014/0082749 A1* | 3/2014 | Holland | ................. | G06F 21/60 726/29 |
| 2014/0226814 A1* | 8/2014 | Fernando | ................. | H04L 9/06 380/200 |
| 2014/0310518 A1* | 10/2014 | Giladi | ................ | H04N 21/2347 713/165 |

OTHER PUBLICATIONS

Dworkin, M., "Computer Security," NIST Special Publication 800-38A, 2001 edition, 66 pages, Dec. 2001.

International Search Report and Written Opinion mailed on Oct. 29, 2012 for International Application No. PCT/US2012/029222, filed Mar. 15, 2012 (3 pages).

\* cited by examiner

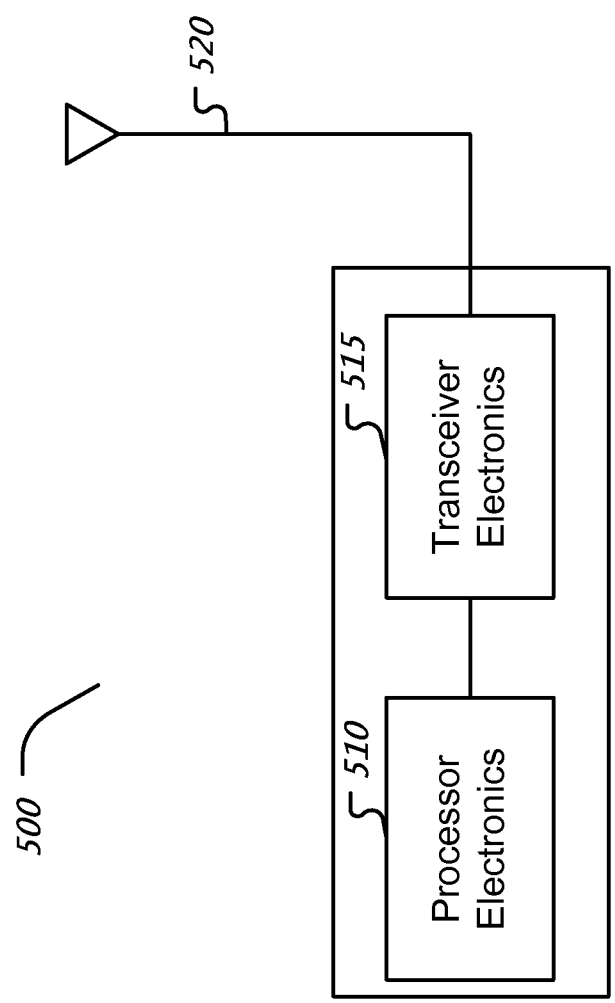

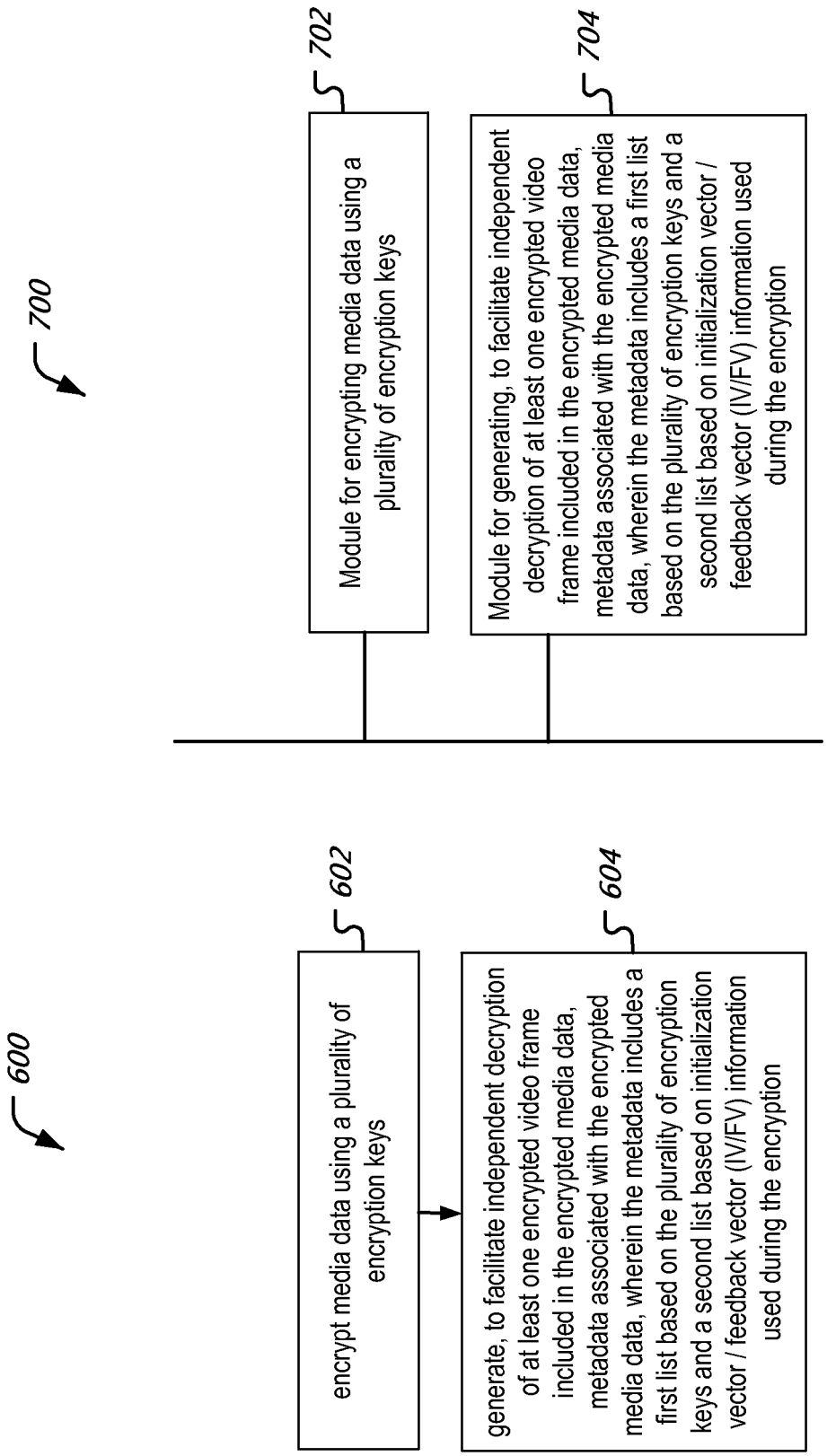

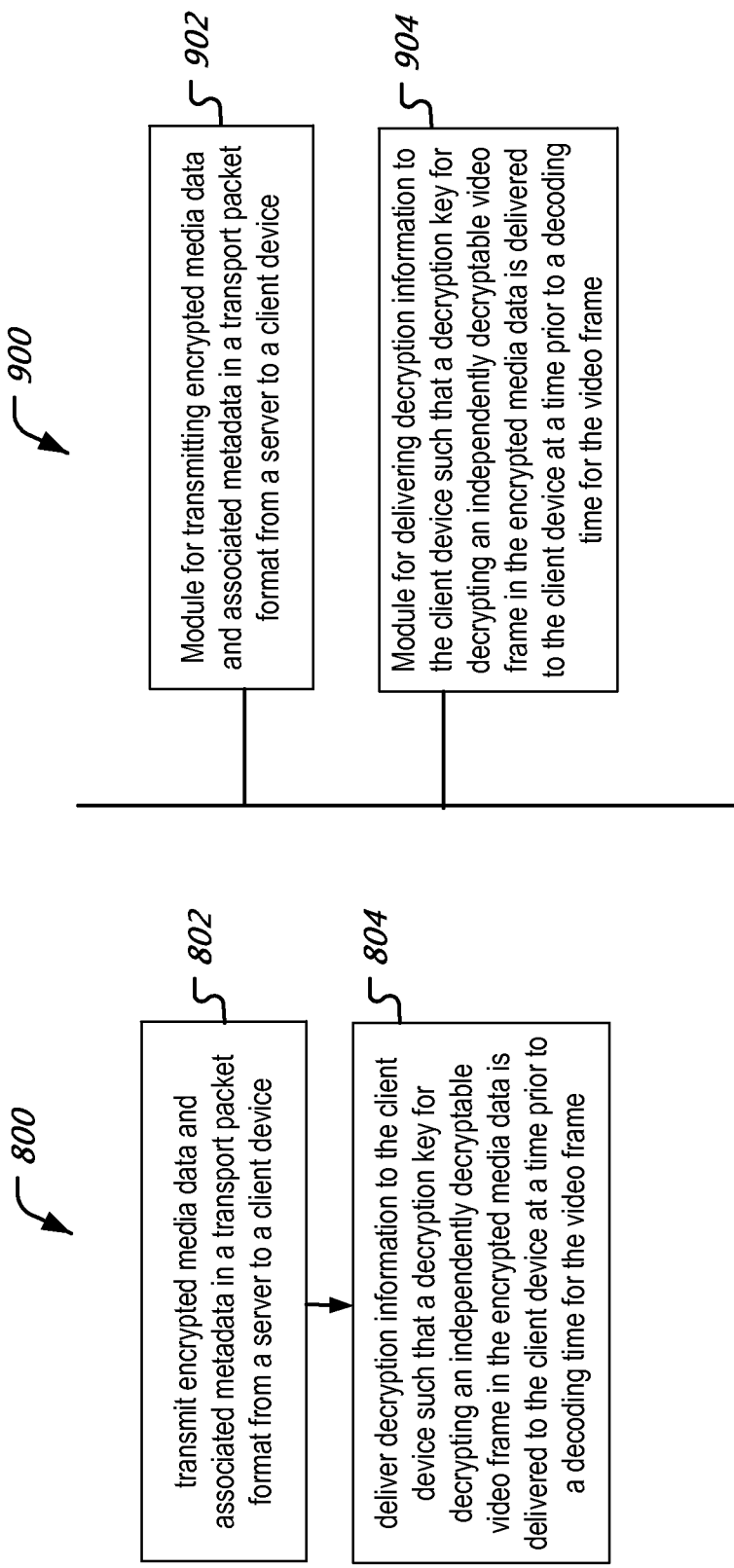

METHODS AND APPARATUS FOR INDEPENDENT DECRYPTION OF ENCRYPTED VIDEO FRAMES

CROSS REFERENCE TO RELATED APPLICATIONS

This patent document claims the benefit of priority of U.S. Provisional Patent Application No. 61/453,539, filed on Mar. 16, 2011, entitled "DASH—TRANSPORT AND USE OF CRYPTOGRAPHIC INFORMATION TO ENABLE INDEPENDENTLY DECRYPTABLE FRAMES FOR VIDEO PROCESSING."

The entire content of the above referenced patent application is incorporated by reference as a part of this patent document.

BACKGROUND

This patent document relates to the generation, transmission and reception of encrypted multimedia data.

Internet Protocol (IP) is fast becoming the transport format of choice for delivering audio/video to users. The delivery may occur, for example, over communications networks such as wired (cable model or digital subscriber loop) or wireless (3G, 4G, Wi-Fi etc.) networks. However, to ensure a high quality of service, several operational challenges need to be overcome. For example, often users are inside a firewall and/or gateway, e.g., a corporate firewall or a network gateway server and special techniques may have to be used to ensure delivery of multimedia content through such IP network elements. Furthermore, multimedia content is typically encrypted. Hypertext transport protocol (HTTP) is fast becoming a protocol of choice for delivering or streaming multimedia content to users.

Improvements are needed to IP delivery of encrypted multimedia data.

SUMMARY

This document describes technologies, among other things, that, in certain embodiments, are useful for packaging and transporting encrypted multimedia data such that at least some encrypted video frames are independently decodable. In one aspect, independent decodability is useful in trick mode (fast forward or rewind) user experience. In another aspect, low complexity and frame accurate advertisement insertion is made possible.

In one aspect, a disclosed method of generating encrypted media data includes encrypting media data using a plurality of encryption keys and generating, to facilitate independent decryption of at least one encrypted video frame included in the encrypted media data, metadata associated with the encrypted media data, wherein the metadata includes a first list based on the plurality of encryption keys and a second list based on initialization vector/feedback vector (IV/FV) information used during the encryption.

In another aspect, a disclosed method of communicating encrypted media data includes transmitting encrypted media data and associated metadata in a transport packet format from a server to a client device and delivering decryption information to the client device such that a decryption key for decrypting an independently decryptable video frame in the encrypted media data is delivered to the client device at a time prior to a decoding time for the video frame, wherein the metadata includes a pointer associating the independently decryptable video frame with the corresponding decryption information.

In yet another aspect, a disclosed method of decrypting media data includes receiving encrypted media data in data packets having a transport format, receiving metadata associated with the encrypted media data in the transport format, the metadata comprising decryption information facilitating independent decryption of the independently decryptable video frame and decrypting the independently decryptable video frames using the decryption information.

In yet another aspect, a disclosed apparatus for generating an encrypted video bitstream includes an encrypter that performs cipher-block chaining (CBC) encryption of media data and a metadata generator that generates, to facilitate independent decryption of at least one encrypted video frame included in the encrypted media data, metadata associated with the encrypted media data, wherein the metadata includes a first list based on the plurality of encryption keys and a second list based on initialization vector/feedback vector (IV/FV) information used during the encryption.

In yet another aspect, a disclosed apparatus for communicating encrypted media data includes a transmitter that transmits encrypted media data and associated metadata in a transport packet format from a server to a client device and a deliverer that delivers decryption information to the client device such that a decryption key for decrypting an independently decryptable video frame in the encrypted media data is delivered to the client device at a time prior to a decoding time for the video frame, wherein the metadata includes a pointer associating the independently decryptable video frame with the corresponding decryption information.

In yet another aspect, a disclosed video decryption apparatus includes a data receiver that receives encrypted media data in data packets having a transport format, a metadata receiver that receives metadata associated with the encrypted media data in the transport format, the metadata comprising decryption information facilitating independent decryption of the independently decryptable video frame and a decrypter that decrypts the independently decryptable video frames using the decryption information.

The details of one or more implementations are set forth in the accompanying attachments, the drawings, and the description below. Other features will be apparent from the description and drawings, and from the claims.

BRIEF DESCRIPTION OF THE DRAWINGS

FIG. 5 is a block diagram representation of a client device.

FIG. 6 is a flow chart representation of a method of generating encrypted media data.

FIG. 7 is a block diagram representation of a portion of an apparatus for generating encrypted media data.

FIG. 8 is a flow chart representation of a method of communicating encrypted media data.

FIG. 9 is a block diagram representation of an apparatus for communicating encrypted media data.

Like reference symbols in the various drawings indicate like elements.

DETAILED DESCRIPTION

When compressed audio/video data is encrypted for content protection, e.g., using a digital rights management (DRM) or a Conditional Access algorithm, the data corresponding to each video frame cannot typically be accessed easily. This is particularly true when multiple cryptographic key methods with key toggling are applied to the encrypted data. One operational reason why multiple key cryptographic methods are applied to the same encrypted stream is that using multiple levels of encryption is viewed as providing a higher level of protection to the content. Note that the term video "frame" is used to generally refer to a unit of decoding and displaying visual information. The techniques disclosed below are equally applicable to a video picture, which may comprise two fields (odd and even field) or one field or a single frame of progressive scan video. The term "frame" is used for to generally refer to all of the above possible presentation units of video.

In some embodiments, the techniques discussed below would lead to simplifying access and extraction of Independently Decryptable Frames (IDF). Two different operational scenarios where these techniques can be used are discussed below.

In one scenario, one set of cryptographic information could be applicable to either the complete encrypted video program being generated or delivered from the server to the client, or to a large part of the encrypted video program. In a typical implementation, the cryptographic data is cached at the client device in order to enable independent decryption of video frames. In some disclosed implementations, the cryptographic data corresponding to a given video frame would be fetched when required, thereby eliminating the need to perform any caching of the cryptographic data.

In another scenario, where multiple cryptographic data sets are required for decryption of encrypted video content the multiple cryptographic data sets could be fetched when required.

In some embodiments, the techniques disclosed in this document can be implemented at a server in a communications network. The communication network can be, e.g., a cable modem network (e.g., a DOCSIS-compliant cable network) or a digital subscriber loop (DSL) network. In some implementations, the communication path between a server that transmits encrypted multimedia data and a client device that receives the multimedia data comprises at least one wireless portion. The specific details of wired and wireless networks are well understood by one of skill in the art and are omitted from this document for brevity. However, as an example embodiment, a wireless network configuration is briefly described next.

Figure 1:
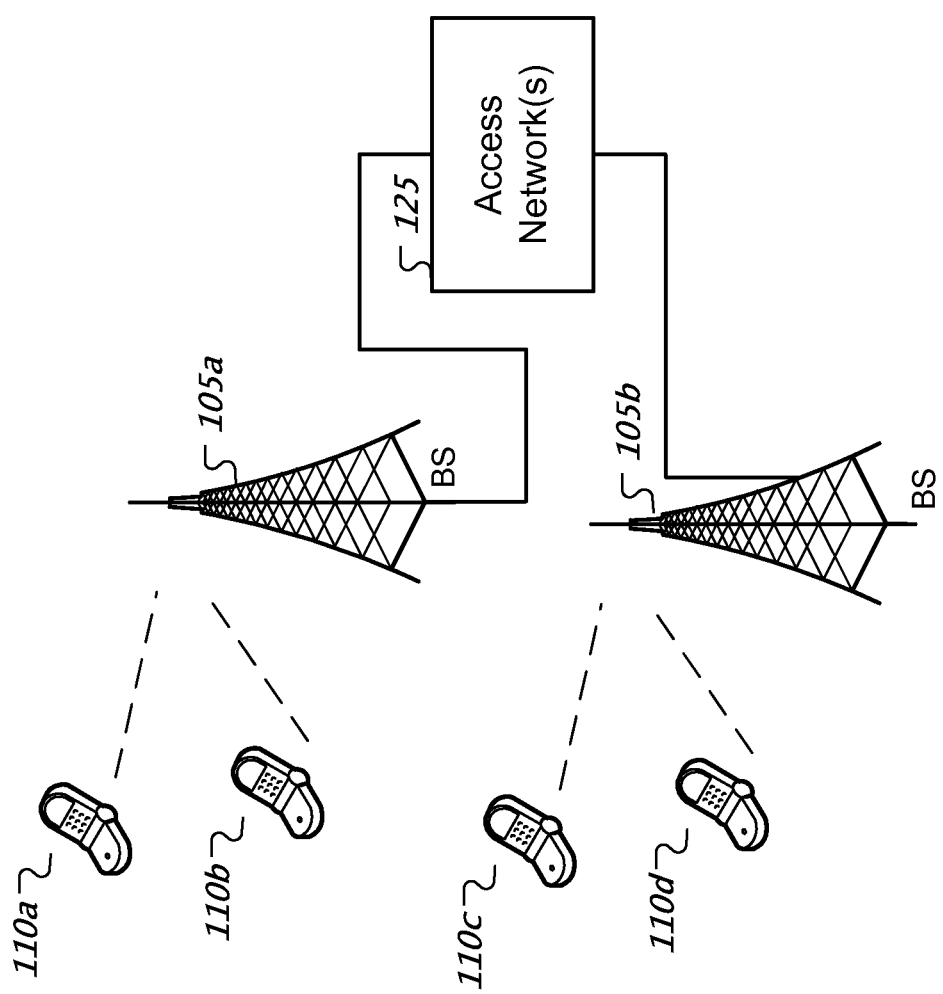
FIG. 1 is a block diagram representation of a communication network for delivering encrypted multimedia data.

FIG. 1 is a block diagram representation of a wireless network in which video can be delivered. A wireless communication system can include one or more base stations (BSs) 105a, 105b and one or more wireless devices 110. A base station 105a, 105b can transmit a signal on a forward link (FL), or a downlink (DL), to one or more wireless devices 110. A wireless device 110 can receive a signal from a base station via the respective forward link (FL) or a downlink (DL), and can transmit a signal on a reverse link (RL), or uplink (UL), to one or more base stations 105a, 105b. A wireless communication system can include one or more core networks 125 to control one or more base stations. In some implementations, a wireless communication system can include different access networks (ANs) for different radio access technologies (RATs).

Base stations 105a, 105b can be configured to operate based on or use same or different wireless technologies. For example, one base station 105a can use E-UTRAN technology and a different base station 105b can use eHRPD technology. Examples of wireless communication systems that can implement the present techniques and systems include, among others, wireless communication systems based on Code Division Multiple Access (CDMA) such as CDMA2000 1x, High Rate Packet Data (HRPD), Evolved High Rate Packet Data (eHRPD), Evolved Universal Terrestrial Radio Access Network (E-UTRAN), the Worldwide Interoperability for Microwave Access (WiMAX) technology and a WiFi technology under an IEEE 802.11 standard. A wireless device 110 can be configured to use one or more RATs such as HRPD, eHRPD, and E-UTRAN.

This document provides techniques for transporting frames of multimedia data in data communications. One method, for example, is provided to include configuring the Index file/URL resource to include a first list of Cryptographic keys and a second list of initialization Vector/Feedback Vectors (IV/FV); and configuring each media frame as an independently decryptable frame to include a first pointer to a particular cryptographic key from the first list and a second pointer to a particular IV/FV from the second list to enable proper decryption of a media frame based on the particular cryptographic key and the particular IV/FV. This method and its implementation are described in detail below.

A recent industry initiative called Moving Pictures Experts Group (MPEG) Dynamic Adaptive Streaming using HTTP (DASH), called MPEG/DASH, allows for compressed data encapsulated in either ISO-File Format (ISO 14496-12) or in MPEG-2 transport Stream (TS) format (ISO 13818-1) to be delivered to clients using the HTTP protocol. The MPEG/DASH specification provides technologies for packaging compressed audio/video/metadata into data packets that can be transferred over a network in the form of HTTP messages from a server to a client device.

Trick modes may help improve a user's experience when receiving multimedia programs, e.g., using MPEG/DASH. Trick mode generally refers to the ability to be able to fast forward or rewind (FF/Rew) a video stream and be able to watch program snippets during the FF/Rew operation. There are other applications that share in common certain video processing functions with trick mode. These include random access, seamless switching and associated advertisement insertion (commonly referred to as ad-insertion) of multimedia data. Each of these functions typically involves accessing and extracting a given segment of data corresponding to a frame of compressed video or audio data. The problems and issues associated with accessing and extracting compressed data, where there may be temporal dependencies, is well understood. One technique used is to include a certain number of Independently Decodable Frames (IDF) in a video bitstream. For example, intra-coded frames (I frames) in an MPEG-2 video stream are typically IDFs.

When the compressed audio/video data is encrypted (e.g., DRM, Conditional Access) prior to transmitting to a client device, the encrypted bitstream looses the ability to provide IDFs to a client device. One reason being that typical encryption algorithms introduce dependencies between encrypted data packets such that information obtained by decrypting one data packet is used for successful decryption of another data packet. For example, a commonly used encryption technique called cipher block chaining (CBC), plaintext data of a present block is XORed with previous ciphertext block and then encryption is performed on the result of the XOR operation. In other words, at a client device, the previous ciphertext block has to be first recovered before the present block can be decrypted. Similar other techniques for encryption build interdependencies between encrypted data blocks.

Figure 2:
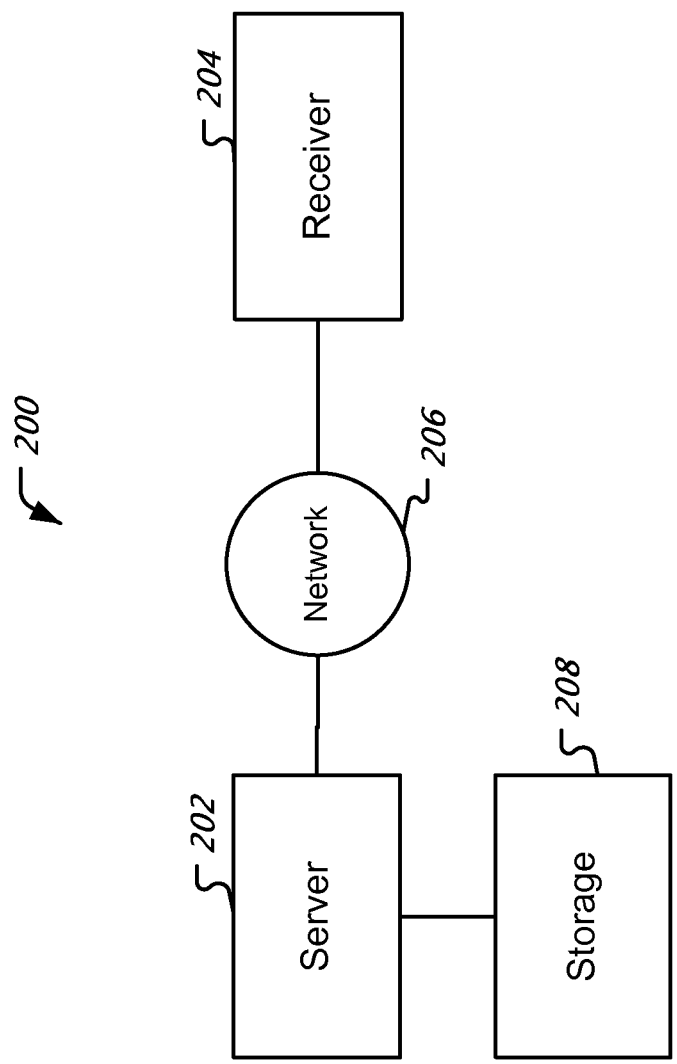
FIG. 2 is a block diagram representation of a wireless network for video delivery.

FIG. 2 is a block diagram representation of a system 200 for delivering encrypted multimedia data. The server 202 delivers encrypted multimedia data to the client device 204 over the communication network 206. In some configurations, the server 202 is coupled with a data storage device 206. In operational scenarios, the server 202 represents a hardware platform or multiple hardware platforms of different software and hardware capabilities. The communication network 206 is, e.g., the Internet, a local or long area network, a wired network, a wireless network, etc. The client device 204 could be a wired or wireless hardware/software platform, e.g., a laptop, a computer, a phone, a tablet, and so on.

Independently Decryptable Frames

It is evident from the previous discussion that encrypted video bitstreams could benefit by techniques of packing these bitstreams into data packets that allow independent decoding access to some video frames in the video bitstream. One possible way in which this can be accomplished is to facilitate independent decryption of video frames. In some embodiments, the information enabling independent decryption of frames is made available at a client device such that the client device can be prepared to decrypt the media content without any interruption to the output data that will then be presented to the media decoder. In some embodiments, this information or crypto-data is made available at the client as metadata. The metadata may be transmitted "in-band" (i.e., along with the encrypted audio/video data) or "out-of-band" (e.g. using a separate transport mechanism such as different packets or different port IDs). In some embodiments, one or both of the following two types of cryptographic data sets are included for independent decryption:

Cryptographic Keys

Initialization Vectors/Feedback Vectors

Cryptographic keys are used for encryption/decryption of media content. In some embodiments, a symmetric key cryptographic method, such as the Advanced Encryption Standard (AES), may be used to encrypt the compressed data. AES is commonly used with a block-chaining (CBC) or feedback (OFB, CFB) mode which uses an Initialization vector (IV) or Feedback vector (FV) for encryption. Hence, this information (IV/FV) is also used for correct decryption of the content at a client device.

This document discloses several techniques for making available or delivering cryptographic keys and IV/FV. The disclosed techniques, in one aspect, are also useful and applicable to system that use multiple cryptographic keys. Some example embodiments of how multiple cryptographic keys are utilized in encrypted video data delivery are discussed next.

Use of Multiple Cryptographic Keys

Figure 3:
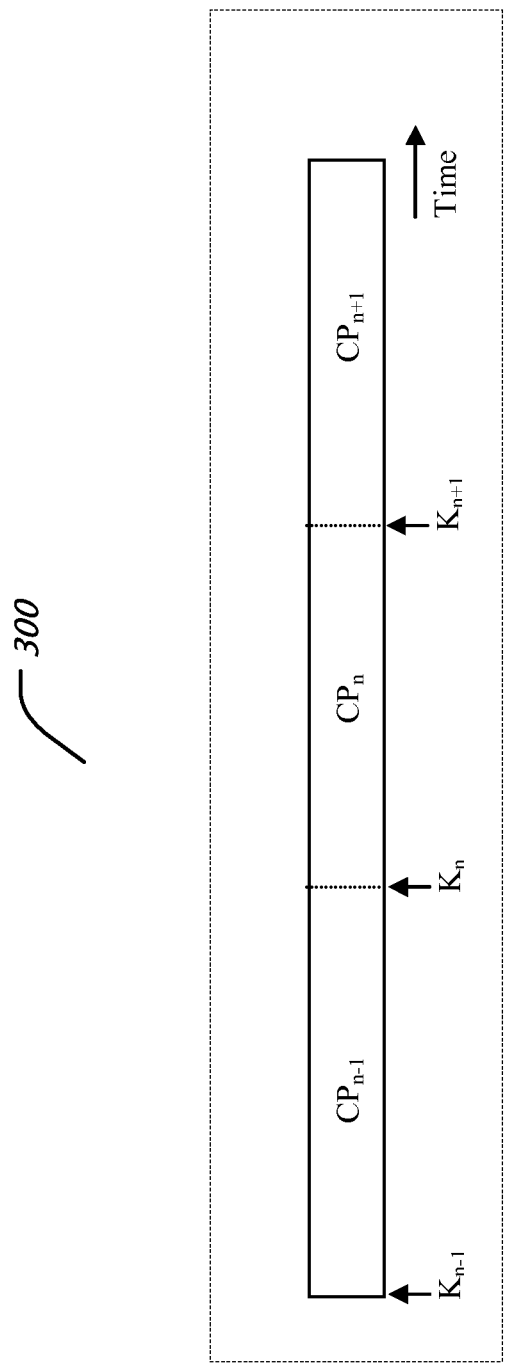
FIG. 3 depicts a time line of delivery of decryption keys.

FIG. 3 depicts an example time line 300 of delivery of decryption keys. The axis 302 represents time. Encrypted video is assumed to be delivered at a certain rate (e.g., in the form of MPEG transport packets or HTTP packets) along the time axis 302. The time axis 302 is depicted to comprise crypto-periods $CP_{n-1}$, $CP_n$, $CP_{n+1}$ and so on. For example, the crypto-period $CP_n$ starts at time 304 and ends at time 306. The cryptographic key, $K_n$ is applicable for the crypto-period $CP_n$. For example, the key $K_n$ is used at an encryption side to encrypt data corresponding to the time period between times 304 and 306. Similarly, the key $K_n$ is used at a decryption side to decrypt data corresponding to the time period between times 304 and 306. In some implementations, the key $K_n$ is delivered (or fetched) at a time instant prior to time 304 (onset of the crypto-period $CP_n$). For the next crypto-period, $CP_{n+1}$ a new key, $K_{n+1}$ is used.

One reason for cycling through different keys $K_n$, $K_{n+1}$, etc. when encrypting content method is to enhance content security by making it difficult to guess a static key. In spite of the increased complexity of timely delivery of these cryptographic keys, such methods are favored by content owners. In some implementations, the cryptographic keys $K_n$, $K_{n+1}$ themselves are encrypted (often with an asymmetric key cryptographic method) such that only an authorized client device can decrypt these keys. The following is an example usage scenario. The crypto-period is set to 10 seconds. For a high value media content, such as a movie release of, say, 90 minutes there will be more than 500 cryptographic keys that will themselves need to be decrypted in order to use them for content decryption. The burden of unauthorized decryption of these 500 cryptographic keys is considered a sufficient deterrent against piracy.

It is noted that the Simulcrypt (ETSI TS103197 v1.3.1) specification uses an encryption method similar to the above-discussed encryption method.

Initialization/Feedback Vector

As previously discussed, several encryption techniques use IV/FV during encryption and decryption. More information on cipher modes can be found in the NIST Special Publication 800-38A [http://csrc.nist.gov/publications/nist-pubs/800-38a/sp800-38a.pdf].

Typically, the first block of encrypted data requires an Initialization vector (IV). For subsequent blocks the result from the previous operation is used, and this result is referred to as the feedback vector (FV).

Transport of Keys and IV/FV

In some implementations, cryptographic keys and IV/FV are transmitted in the form of two separate lists: a crypto-key list and an IV/FV list. These lists may in turn be included in an Index file/URL resource that is transmitted in-band or out-of-band with the encrypted multimedia data.

In an in-band embodiment, the cryptographic keys and IV/FV, or decryption information, is communicated to a client device using a same source origination (e.g., a same URL or a same TCP or UDP port ID). Note that TCP=Transport Control Protocol and UDP=User Datagram Protocol represent two of many different transport formats that can be used for data transfer over a network.

In an out-of-band embodiment, the decryption data (e.g., cryptographic keys and IV/FVs) are transmitted in data packets having different source or destination information (e.g., different URL, different TCP or UDP port, etc.).

In some embodiments, for each media frame that is identified at the server as being independently decryptable, the server includes two pointers—one to a cryptographic key from the crypto-key list, and the other to an IV/FV from the IV/FV list. In some embodiments, the pointers are in the form of URLs that correspond to the location of the corresponding cryptographic information useful for decryption. In some other embodiments, the pointer are offset values within a same file or data packet (e.g., HTTP packet) identifying the location of the decryption information within the data packet. Once the media content and the corresponding Index file/URL resource is delivered to client device, the client device can then obtain the relevant key and the IV/FV in order to correctly and independently decrypt the media frame.

Figure 4:
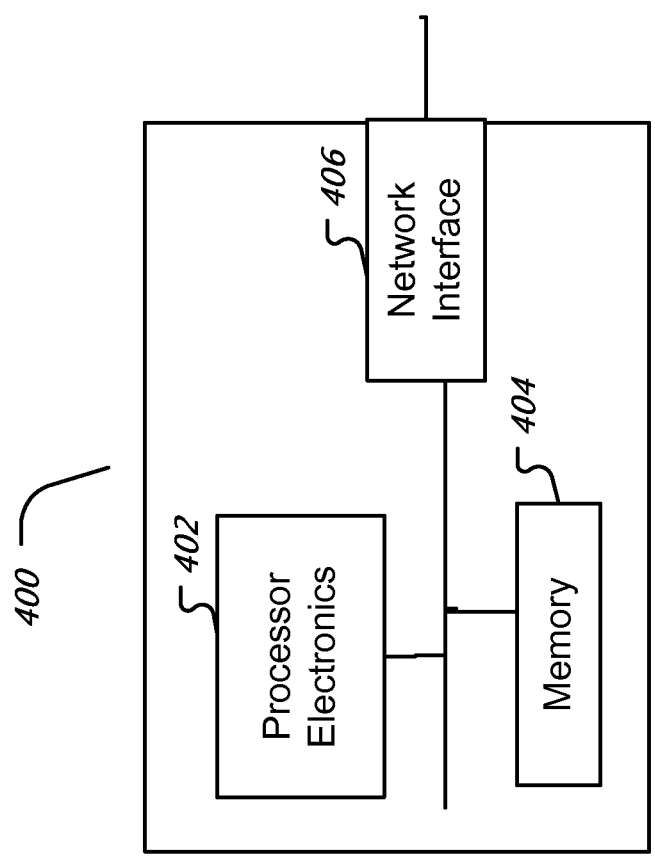
FIG. 4 is a block diagram representation of an encrypted video data server.

FIG. 4 is a block diagram representation of a server 400 for providing encrypted video. The server 400 includes processor electronics 402, a memory 404 for storing code and data and a network interface 406 for transferring encrypted video data to a network (not shown in FIG. 4). In some embodiments, the server 400 generates encrypted media data by performing encryption on data blocks of media data. In some embodiments, the server 400 generates metadata comprising decryption information (e.g., keys and IV/FVs used during encryption). In some embodiments, the server 400 performs the operation of transferring media data and metadata from the server 400 to another device. The transfer may use one of several well known techniques, such as streaming, HTTP, UDP, TCP, etc.

FIG. 5 is a block diagram representation of an example wireless client device 500 for receiving decrypting multimedia data. The antenna 520 is for receiving radio frequency (RF) signals from a network and transmitting signals to the network. The transceiver electronics 515 is for processing data for transmission and reception, as is well known in the art. The processor electronics 510 is for digital operations such as decryption, data parsing and so on.

FIG. 6 is a flow chart representation of a method 600 of generating encrypted media data. At 602, media data is encrypted using a plurality of encryption keys. As previously discussed, in some embodiments, a well-known encryption technique such as the cipher-block coding (CBC) is used. In some embodiments, e.g., Simulcrypt-like embodiments, several keys are used for encryption, each corresponding to a non-overlapping time interval. At 604, to facilitate independent decryption of at least one encrypted video frame included in the encrypted media data, metadata associated with the encrypted media data, wherein the metadata includes a first list based on the plurality of encryption keys and a second list based on initialization vector/feedback vector (IV/FV) information used during the encryption. In some embodiments, the first list and the second list are generated using techniques previously discussed in this document. In some embodiments, a plurality of pointers are associated with the encrypted media data and the metadata such that a given pointer from the plurality of pointer associates an independently decryptable video frame from the encrypted media data with a corresponding first entry in the first list and a second entry in the second list included in the metadata. In some embodiments, the media data and the plurality of pointers are addressable using the same URL (i.e., the pointers and the media data is located at the same source) and is transferred using a transport mechanism such as HTTP or MPEG-TS from a server to a client device.

FIG. 7 is a block diagram representation of a portion of an apparatus 700 for delivering encrypted video data and associated metadata. The module 702 (e.g., an encrypter) is for cipher-block chaining (CBC) encryption of media data. The module 707 (e.g., a metadata generator) is for generating, to facilitate independent decryption of at least one encrypted video frame included in the encrypted media data, metadata associated with the encrypted media data, wherein the metadata includes a first list based on the plurality of encryption keys and a second list based on initialization vector/feedback vector (IV/FV) information used during the encryption. The apparatus 700 and modules 702, 704 may be further configured to implement one or more techniques described in this document.

FIG. 8 is a flow chart representation of a method 800 of communicating encrypted media data. The method 800 may be implemented at a server on the network-side, such as a streaming server or a content server that provides multimedia content to a client device. At 802, encrypted media data and associated metadata is transmitted in a transport packet format from the server to the client device. At 804, decryption information is delivered to the client device such that a decryption key for decrypting an independently decryptable video frame in the encrypted media data is delivered to the client device at a time prior to a decoding time for the video frame. The metadata includes a pointer associating the independently decryptable video frame with the corresponding decryption information. Some implementations use HTTP transport format for the transmission of encrypted video data. The MPEG-TS format may also be used for the transmission, or may be encapsulated within the HTTP format for transmission. In some implementations, the pointer is in the form of a URL (e.g., in the hypertext markup language format). The decryption information may include initialization vectors or feedback vectors used for a block decryption process, such as used in CBC decryption.

FIG. 9 is a block diagram representation of a portion of an apparatus 900 for communicating encrypted video data. The module 902 (e.g., a transmitter) is for transmitting encrypted media data and associated metadata in a transport packet format from a server to a client device. The module 904 (e.g., a deliverer) is for delivering decryption information to the client device such that a decryption key for decrypting an independently decryptable video frame in the encrypted media data is delivered to the client device at a time prior to a decoding time for the video frame. As previously discussed, the metadata includes a pointer associating the independently decryptable video frame with corresponding decryption information (e.g., keys and IV/FV for decryption).

Figure 10:
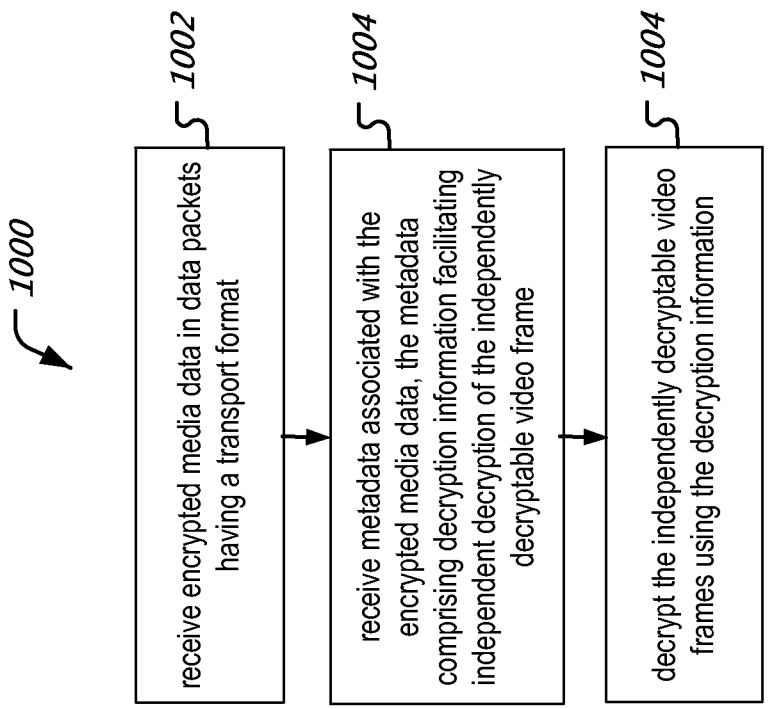
FIG. 10 is a flow chart representation of a method of decrypting media data.

FIG. 10 is a flow chart representation of a method 1000 of decrypting media data. The method 1000 is implementable, e.g., at a client device. At 1002, data packets comprising encrypted metadata and having a transport format are received. At 1004, metadata associated with the encrypted media data is received. The received metadata comprising decryption information facilitating independent decryption of the independently decryptable video frame. At 1006, the independently decryptable video frames are decrypted using the decryption information. As previously discussed, the transport format may be HTTP or MPEG-TS format. In some implementations, the metadata comprises a first list of initialization vectors/feedback vectors (IV/FV) and a second list of encryption keys for decrypting the independently decryptable video frames.

Figure 11:
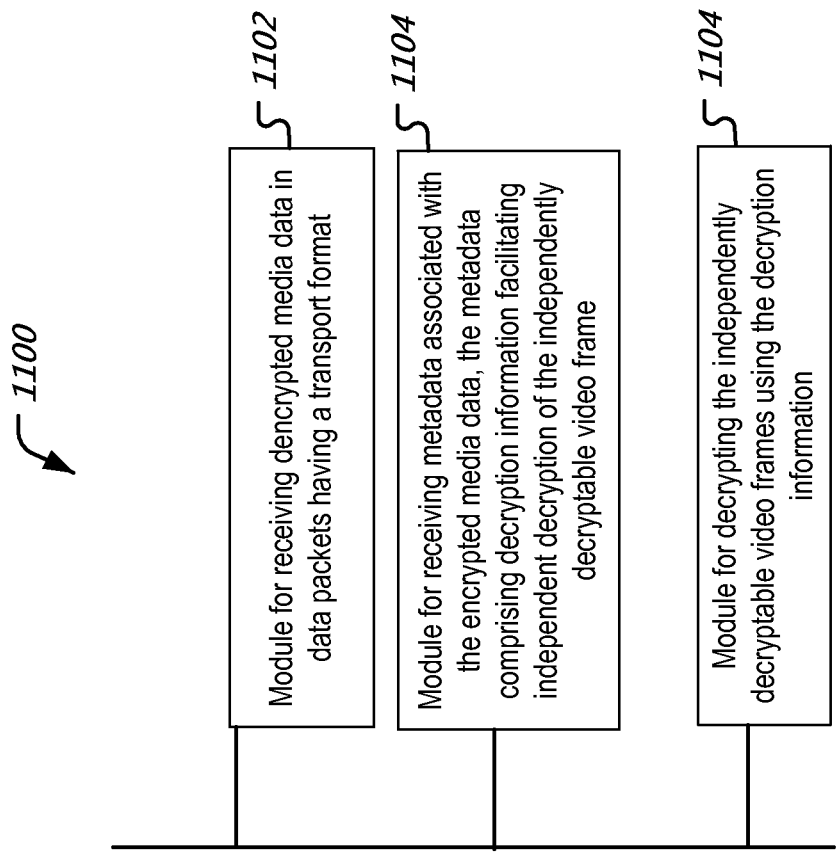
FIG. 11 is a block diagram representation of an apparatus for decrypting media data.

FIG. 11 is a block diagram representation of a portion of a video decryption apparatus 1100. The module 1102 (e.g., a data receiver) is for receiving data packets having a transport format, wherein the data packets include encrypted media data. The module 1104 (e.g., a metadata receiver) is for receiving metadata associated with the encrypted media data, the metadata comprising decryption information facilitating independent decryption of the independently decryptable video frame. The module 1106 (e.g., a decrypter) is for decrypting the independently decryptable video frames using the decryption information. The apparatus 1100 and modules 1102, 1104, 1106 may further be configured to implement one or more techniques described in this document.

It will be appreciated that several techniques are described for identifying/locating in the server the cryptographic information as a URL resource corresponding to a given video program or part of a video program, thus enabling independent decryption of video frames. In one aspect, both the cryptographic data and the encrypted video data to be available in the server as separate HTTP-url resources.

It will also be appreciated that techniques are described in which both cryptographic data and encrypted video data to be transported based on HTTP requests may comply to RFC 2616 using HTTP.

It will further be appreciated that, in some embodiments, the cryptographic data (decryption information) is transported from a server to a client as a file format atom/element or other similar structure.

In some embodiments, if multiple cryptographic data sets are required (as in the case of Simulcrypt) the disclosed techniques provide for these data sets to be identified in the server, and for them to be transported to the client for decryption of the video data.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method of generating encrypted media data, comprising:

encrypting media data by a processor using a plurality of encryption keys, wherein the plurality of encryption keys are encrypted to deter piracy and each encryption key of the plurality of encryption keys is used for a different encryption period;

generating, to facilitate independent decryption of at least one encrypted video frames included in the encrypted media data, metadata associated with the encrypted media data, wherein the metadata includes a first list based on the plurality of encryption keys and a second list based on initialization vector/feedback vector (IV/FV) information used during the encryption; and associating a plurality of pointers with the encrypted media data and the metadata such that, given an independently decryptable video frame from the encrypted media data, a first pointer and a second pointer associate the independently decryptable video frame with the metadata, where the first pointer from the plurality of pointers associates the independently decryptable video frame with a first entry in the first list and the second pointer from the plurality of pointers associates the independently decryptable video frame with a second entry in the second list included in the metadata;

wherein each of the plurality of encryption key is encrypted with an asymmetric key cryptographic method such that only authorized decryption is allowed.

2. The method of claim 1, further comprising:
storing the media data and the plurality of pointers to be accessible using a same user resource locator (URL); and
transferring the media data and the plurality of pointers from a server to a client device.

3. The method of claim 2, wherein the transferring is performed using one of a hypertext transport protocol (HTTP) and a Moving Pictures Expert Group (MPEG) Transport Stream (TS) formats.

4. An apparatus, comprising:
a memory that stores processor-executable instructions; and
a processor that executes the instructions from the memory, causing the processor to:
facilitate encryption of media data using a plurality of encryption keys, wherein the plurality of encryption keys are encrypted to deter piracy and each encryption key of the plurality of encryption keys is used for a different encryption period;
generate, to facilitate independent decryption of at least one encrypted video frame included in the encrypted media data, metadata associated with the encrypted media data, wherein the metadata includes a first list based on the plurality of encryption keys and a second list based on initialization vector/feedback vector (IV/FV) information used during the encrypting step; and
associate a plurality of pointers with the encrypted media data and the metadata such that, given an independently decryptable video frame from the encrypted media data, a first pointer and a second pointer associate the independently decryptable video with the encrypted media data,
wherein the first pointer from the plurality of pointers associates the independently decryptable video frame with a first entry in the first list and the second pointer from the plurality of pointers associates the independently decryptable video frame with a second entry in the second list included in the metadata;
wherein each of the plurality of encryption key is encrypted with an asymmetric key cryptographic method such that only authorized decryption is allowed.

5. The apparatus of claim 4, wherein the processor further:
stores the media data and the plurality of pointers to be accessible using a same user resource locator (URL); and
transfers the media data and the plurality of pointers from a server to a client device.

6. The apparatus of claim 5, wherein the transferring is performed using one of a hypertext transport protocol (HTTP) and a Moving Pictures Expert Group (MPEG) Transport Stream (TS) formats.

7. A method of communicating encrypted media data, comprising:
transmitting encrypted media data in a transport packet format from a server to a client device;
associate a plurality of pointers with the encrypted media data and the metadata such that, given an independently decryptable video frame from the encrypted media data, a first pointer and a second pointer associate independently decryptable video with the encrypted media data; and
delivering decryption information, including a first list of a plurality of decryption keys and a second list of initialization vectors/feedback vectors (IV/FV), to the client device such that a decryption key from the first list of the plurality of decryption keys for decrypting an independently decryptable video frame in the encrypted media data is delivered to the client device at a time prior to a decoding time for the video frame, wherein the decryption key is encrypted to deter piracy and the client device decrypts the decryption key upon authorization, wherein the decryption key is encrypted with an asymmetric key cryptographic method such that only authorized decryption is allowed;
wherein the decryption information further includes, for the independently decryptable video frame, the first pointer and the second pointer associating the independently decryptable video frame with the first list and the second list, wherein the first pointer associating the independently decryptable video frame with a first entry in the first list and the second pointer associating the independently decryptable video frame with a second entry in the second list.

8. The method recited in claim 7, wherein the transmitting is performed using one of a hypertext transport protocol (HTTP) and a Moving Pictures Experts Group (MPEG) transport stream format.

9. The method recited in claim 7, wherein the pointer comprises a user resource locator (URL).

10. The method recited in claim 7, wherein the decrypting the independently decryptable video frame uses a cipher block chaining (CBC) encryption scheme.

11. The method recited in claim 7, wherein the transmitting and the delivering use a same source and a same destination.

12. The method recited in claim 7, wherein the transmitting and the delivering use a different source and a different destination.

13. An apparatus for communicating encrypted media data, comprising:
a memory that stores processor-executable instructions; and
a processor that executes the instructions from the memory, causing the processor to:
transmit encrypted media data in a transport packet format from a server to a client device;
associate a plurality of pointers with the encrypted media data and the metadata such that, given an independently decryptable video frame from the encrypted media data, a first pointer and a second pointer associate independently decryptable video with the encrypted media data; and deliver decryption information, including a first list of a plurality of decryption keys and a second list of initialization vectors/feedback vectors (IV/FV), to the client device such that a decryption key from the first list of the plurality of decryption keys for decrypting an independently decryptable video frame in the encrypted media data is delivered to the client device at a time prior to a decoding time for the video frame, wherein the decryption key is encrypted to deter piracy and the client device decrypts the decryption key upon authorization, wherein the decryption key is encrypted with an asymmetric key cryptographic method such that only authorized decryption is allowed;

wherein the decryption information further includes, for the independently decryptable video frame, the first pointer and the second pointer associating the independently decryptable video frame with the first list and the second list, wherein the first pointer associating the independently decryptable video frame with a first entry in the first list and the second pointer associating the independently decryptable video frame with a second entry in the second list.

14. The apparatus recited in claim 13, wherein the transmitting uses one of a hypertext transport protocol (HTTP) and a Moving Pictures Experts Group (MPEG) transport stream format.

15. The apparatus recited in claim 13, wherein the pointer comprises a user resource locator (URL).

16. The apparatus recited in claim 13, wherein the decrypting the independently decryptable video frame uses a cipher block chaining (CBC) encryption scheme.

17. The apparatus recited in claim 13, wherein the transmitting and the delivering use a same source and a same destination.

18. The apparatus recited in claim 13, wherein the transmitting and the delivering use a different source and a different destination.

19. A method of decrypting media data, comprising:
receiving encrypted media data in data packets having a transport format;
receiving metadata associated with the encrypted media data in the transport format, the metadata comprising decryption information facilitating independent decryption of an independently decryptable video frame;
using a plurality of pointers associated with the encrypted media data and the metadata for decryption such that, given an independently decryptable video frame from the encrypted media data, a first pointer and a second pointer associate the independently decryptable video frame with the metadata, and
decrypting the independently decryptable video frames by a processor using the decryption information, wherein the decryption information includes a first list of a plurality of decryption keys and a second list of initialization vectors/feedback vectors (IV/FV) and each decryption key in the first list of the plurality of decryption keys is used to decrypt the independently decryptable video frames for a different decryption period, wherein the decryption key is encrypted with an asymmetric key cryptographic method such that only authorized decryption is allowed;

wherein the first pointer and the second pointer associate the independently decryptable video frame with the first list and the second list, such that the first pointer associates the independently decryptable video frame with a first entry in the first list and the second pointer associates the independently decryptable video frame with a second entry in the second list.

20. The method recited in claim 19, wherein the transport format comprises one of hypertext transport protocol (HTTP) and Moving Pictures Expert Group (MPEG) transport stream format.

21. A video decryption apparatus, comprising:
a memory; and
a processor configured to read instructions from memory and implement a method, comprising:
receiving encrypted media data in data packets having a transport format;
receiving metadata associated with the encrypted media data in the transport format, the metadata comprising decryption information facilitating independent decryption of an independently decryptable video frame;
use a plurality of pointers associated with the encrypted media data and the metadata for decryption such that, given an independently decryptable video frame from the encrypted media data, a first pointer and a second pointer associate the independently decryptable video frame with the metadata; and
decrypting the independently decryptable video frames using the decryption information, wherein the decryption information includes a first list of a plurality of decryption keys and a second list of initialization vectors/feedback vectors (IV/FV) and each decryption key in the first list of the plurality of decryption keys is used to decrypt the independently decryptable video frames for a different decryption period, wherein the decryption key is encrypted with an asymmetric key cryptographic method such that only authorized decryption is allowed;
wherein the first pointer and the second pointer associate the independently decryptable video frame with the first list and the second list, such that the first pointer associates the independently decryptable video frame with a first entry in the first list and the second pointer associates the independently decryptable video frame with a second entry in the second list.

22. The apparatus recited in claim 21, wherein the transport format comprises one of hypertext transport protocol (HTTP) and Moving Pictures Expert Group (MPEG) transport stream format.

* * * * *